United States Patent Office 3,314,906
Patented Apr. 18, 1967

3,314,906
VINYL ASBESTOS COMPOSITION STABILIZED
WITH MELAMINE AND ROSIN
George E. Bagley, Lancaster County, Pa. (2425 Mayfair Drive, Lancaster, Pa. 17603), and William F. Goodyear, Jr., Lancaster County, Pa. (72 Barre Drive, Lancaster, Pa. 17601)
No Drawing. Filed Feb. 26, 1965, Ser. No. 435,721
8 Claims. (Cl. 260—27)

This invention relates generally to a vinyl asbestos composition, and more particularly to a vinyl asbestos composition for use in the formation of flooring tile. Still more particularly, the invention relates to vinyl asbestos composition tile which is resistant to the effects of heat and moisture when installed as a floor.

Tiles containing vinyl halide resins and asbestos are subject to discoloration and to moisture pickup when in use. Heat may cause discoloration of the tile and moisture, if it is absorbed, may cause growth of the tile with attendant buckling or other destruction of the floor.

U.S. Patent No. 3,084,135, Scullin, issued Apr. 2, 1963, discloses a vinyl asbestos composition stabilized with a heat-stabilizing amount of melamine. The disclosure of that patent is hereby incorporated herein by reference. The addition of melamine to a vinyl asbestos tile composition produces many advantages in the tile composition. However, one problem remains. The use of different asbestoses in the vinyl asbestos composition in conjunction with the melamine will often produce a tile which has a pink color. This pink color may disappear on exposure to light or air or both as far as the surface appearance is concerned, but when the surface is removed, it is found that the pink color extends all the way through the tile. Although it has been found that certain compounds, for example bisphenols and polyhydroxyl compounds such as pentaerythritol, may eliminate the pink color from the melamine-containing vinyl asbestos composition, such compounds are water sensitive. To the extent that they are water sensitive, they are undesirable in the vinyl asbestos composition. Furthermore, these compounds are difficult to incorporate into the tile-making process. Hence there is a need for an additive to eliminate these difficulties.

It is the primary object of the present invention to supply such an additive. It is a further object of the present invention to supply a vinyl asbestos tile composition which is stable to heat and to moist conditions. It is still another object of the present invention to present a stable vinyl asbestos composition suitable for making heat and moisture-resistant tile economically by existing methods of tile manufacture.

These objects are achieved in a strikingly straightforward and effective manner. The invention contemplates a vinyl asbestos composition comprising a vinyl chloride resin, asbestos, and a stabilizing system comprising a stabilizng amount of melamine and rosin acid.

The vinyl chloride resins used in the composition of the present invention are the addition polymers produced by polymerization of vinyl chloride either alone or in the presence of one or more polymerizable compounds. Preferably the vinyl chloride resin will be a straight poly(vinyl chloride), or a vinyl chloride-vinyl acetate copolymer, or a mixture of the two types of resins. The vinyl acetate copolymers contain generally about 3% up to about 20% by weight vinyl acetate copolymerized with the vinyl chloride, and most preferably, about 13% by weight vinyl acetate. These resins will generally have an intrinsic viscosity in cyclohexanone at a temperature of 30° C. of between about 0.3 and 1. The vinyl chloride may also be copolymerized with such comonomers as vinylidene chloride, vinyl proprionate, vinyl butyrate, or the acrylates or methacrylates. The vinyl chloride resin serving as a binder will generally be present in the vinyl asbestos composition in an amount of about 8%–30% by weight of the total composition.

Accompanying the vinyl chloride resin binder will be any of the plasticizers suitable for plasticizing the vinyl chloride resin. Such plasticizers are well known and may be any of such standard plasticizers as tricresyl phosphate, dibutyl phthalate, dioctyl phthalate, butyl benzylphthalate, butyl octyl phthalate, dipropylene glycol dibenzoate, and the epoxidized vegetable oils such as epoxidized soya bean oil. This last plasticizer also has a stabilizing effect against degradation of the vinyl chloride resin through the action of heat or light. Polyester plasticizers for the vinyl chloride resins may also be used. Generally speaking, such plasticizers will be present in an amount of about 0.2%–10% by weight plasticizer based on the weight of the total composition.

The vinyl asbestos compositions contain a fibrous filler in the form of asbestos, preferably chrysotile asbestos. Long asbestos fibers are unnecessary, and economy normally dictates the use of the shorter fiber lengths such as 7D, 7R, and other similar short fibers. While long fibers may be introduced into the composition, they will generally be shortened during the thorough mixing processes that must be undertaken to blend the ingredients in the composition. The amount of asbestos to be used will generally be in the range of about 3%–50% by weight asbestos based on the weight of the total composition.

Vinyl asbestos compositions also contain a granular inorganic filler, preferably ground limestone. However, in place of the calcium carbonate there may be used calcium silicate, barium sulfate, barium carbonate, silicon dioxide, ground serpentine, magnesium silicate, the talcs, and other granular, inert, inorganic materials. The size range for the granular or powdered inorganic fillers will generally be between 20 mesh and 200 mesh, U.S. series, preferably about 40 mesh, with minor fractions of the filler permissibly being even smaller than 200 mesh. The granular inorganic filler is generally present in the vinyl asbestos composition in an amount of 20%–80% by weight based on the weight of the total composition.

The vinyl asbestos composition will also generally contain relatively small amounts of pigments such as titanium dioxide or other coloring agents to impart the desired appearance to the tile composition. Small amounts of additional materials such as hydrocarbon resins, lubricants, additional stabilizers, such as the zinc, barium and cadmium salts of organic acids such as lauric and stearic may also be incorporated. Such pigments, lubricants, coloring agents, and other additives, will generally be present in an amount less than about 10% by weight of the total composition.

The melamine to be added to the vinyl asbestos composition is a known item of commerce. The addition of melamine does a good job of stabilizing the vinyl asbestos tile composition against the degradative effects of heat and light on the tile when installed on the floor. The melamine also has some beneficial effects in minimizing moisture pickup of the tile. However, as mentioned earlier, an unacceptable pink color often appears in the tile made from a vinyl asbestos composition containing melamine. To make an acceptable tile, this pink color must be eliminated. At the same time, it is desirable to enhance the effect of the melamine in minimizing moisture pickup by the finished tile. In the above-identified Scullin patent, it is stated that the vinyl asbestos composition should contain approximately 0.3 to 10 and preferably 1 to 5 parts by weight of the melamine per 100 parts by weight of the vinyl chloride resin. Put on another basis for the purposes of the present invention, the vinyl asbestos composition should contain 0.1%–2.5% by weight melamine based on the total weight of the composition, and preferably about 0.4%–1%.

The particular additive of the present invention which solves the problems left by the use of melamine alone or melamine in combination with other known additives is rosin acid. The term "rosin acid" is used herein to identify the acids found in any of the commercial rosins. Commercial rosin is of three types, gum rosin, wood rosin, and rosin obtained from tall oil. Gum rosin is the residue of a distillation performed on a sticky mixture called oleoresin obtained from a tapped, living pine tree. Wood rosin is obtained by solvent extraction of pine tree stumps which have been in the ground for a number of years after the tree has been cut down. A third source of rosin acids in tall oil, a by-product of wood pulp manufacture. Rosin is most usually composed approximately of 90% by weight acidic material and 10% neutral material. The characteristics of rosin are determined largely by the acid fraction. Of the acid fraction, about 50% by weight consists of abietic acid, levopimaric acid, and neoabietic acid. These three acids differ only in the position of the conjugated system in the molecule. Another 20% by weight of the acid fraction is often made up of two stereoisomers, dextropimaric and isodextropimaric acids. The balance of the rosin acid fraction comprises tetrahydroabietic acid which has no ethylenic unsaturation, dihydroabietic acid which contains one double bond, and dehydroabietic acid, the unsaturation of which consists of an aromatic ring.

Another usable rosin acid is that obtained from rosin by carrying out a polymerization at room temperature by the action of alkyl or metal halides or inorganic acids. Rosin may be dissolved in a solvent such as petroleum ether and treated with concentrated sulfuric acid—with cooling—for six hours. The resulting polymerized rosin is esentially a dimer in which the abietic acid molecules are joined together by a sharing of one of the double bonds. This dipolymer, called dimerized rosin acid herein, is particularly suitable in the present invention.

All of the rosin acids suitable for use in the present invention are characterized by the presence on the molecule of a carboxylic acid group. The dimer rosin acid has two such groups since the acid groups survive the polymerization intact. It is postulated that the acid group of the rosin acid reacts with the asbestos fiber in the vinyl asbestos tile composition and thus has some effect on the iron in the asbestos composition, serving to eliminate the coloring effect of the iron. The dimer rosin acid performs slightly better than the rosin acid itself, possibly because of the presence of two carboxylic acid groups on the single larger molecule. The use of a commercial rosin, containing as it does a heterogeneous mixture of rosin acids, produces approximately the same result in the present invention as does pure abietic acid itself. The rosin acid is to be used in the present composition in an amount in the range of about 0.05%–4% by weight based on the total weight of the composition. Preferably, the amount will be in the range of about 0.2%–1.2% by weight.

It should be emphasized that those rosin acid derivatives which do not contain a carboxylic acid group do not give the unexpectedly good results of the rosin acids themselves. Compositions containing rosin acid esters do not produce satisfactory results.

In forming the vinyl asbestos composition tile, all the ingredients are thoroughly blended at a temperature generally in the range of 250°–350° F. Mixing will often take 45 seconds to six minutes in a Banbury mixer and 15 to 45 minutes at the elevated temperature in a Baker-Perkins mixer. After the ingredients have been thoroughly mixed, they are then passed through a mill to form a tile blanket. The tile blanket is formed in accordance with methods well known in the art, generally between a cold roll maintained at a temperature of about 140°–220° F. and a hot roll maintained at a temperature of about 240°–350° F. The tile is then passed through at least one calender to finish forming the sheet. The calender face roll temperature may be maintained at about 110°–200° F. while the back roll may be relatively cool, below about 160° F. These roll temperatures, however, may vary. After calendering, the blanket is cooled and finally cut into tile of the desired size. Any finishing operations such as coating the surface with a wax, lacquer, or other coating material may then be carried out. The tile is then ready for installation on a floor.

The following examples illustrate several embodiments of the invention. All parts are by weight unless otherwise stated.

EXAMPLE 1

A series of vinyl asbestos compositions were thoroughly blended at a temperature in the range of 280°–320° F. Tiles were made from each composition. Following is the list of ingredients in each series of tile:

| Ingredients | Parts | | | | | | | |
|---|---|---|---|---|---|---|---|---|
| | Control | A | B | C | D | E | F | G |
| Asbestos | 200 | 200 | 200 | 200 | 200 | 200 | 200 | 200 |
| Limestone | 570 | 570 | 570 | 570 | 570 | 570 | 570 | 570 |
| Titanium dioxide | 40 | 40 | 40 | 40 | 40 | 40 | 40 | 40 |
| Vinyl chloride-vinyl acetate copolymer resin mixture | 134 | 128 | 128 | 128 | 128 | 128 | 127 | 127 |
| Epoxidized soya oil | 6.2 | 6.2 | 6.2 | 6.2 | 6.2 | 6.2 | 6.2 | 6.2 |
| Butyl benzyl phthalate | 41.8 | 42.8 | 42.8 | 42.8 | 42.8 | 42.8 | 41.8 | 41.8 |
| Dicyandiamide, 70% | 4 | | | | | | | |
| Barium stearate | 1.5 | 2 | 2 | 2 | 2 | 2 | 2 | 2 |
| Zinc stearate | 1.5 | 1 | 1 | 1 | 1 | 1 | 1 | 1 |
| Alpha methyl glucoside | 1 | | | | | | | |
| Melamine | | 8 | 8 | 8 | 8 | 6 | 8 | 8 |
| Abietic acid | | | 2 | | | | 4 | |
| W.W. wood rosin | | 2 | | | | | | 4 |
| Dimerized rosin (Dymerex) | | | | 2 | | | | |
| Dimerized wood rosin (Penros) | | | | | 2 | 2 | | |

Dymerex is 80% by weight rosin acid dimer, and 20% by weight monomeric rosin acids and neutral materials. Penros is dimerized wood rosin containing 14% unsaponifiables. W. W. wood rosin is a light colored wood rosin containing about 90% rosin acids and 10% neutral materials.

Specimens of tile made from each of the compositions listed above were tested as to whether or not the initial color was satisfactory or unsatisfactory, and as to the percent of moisture growth and the percent of moisture absorption. Following are the results:

| Tile | Initial Color | Moisture Growth, Percent | Moisture Absorption, Percent |
|---|---|---|---|
| Control | Sat | 0.31 | 2.03 |
| A | Sat | 0.05 | 1.14 |
| B | Sat | 0.09 | 1.05 |
| C | Sat | 0.09 | 1.06 |
| D | Sat | 0.10 | 1.09 |
| E | Sat | 0.10 | 1.01 |
| F | Sat | 0.05 | 0.88 |
| G | Sat | 0.05 | 1.07 |

EXAMPLE 2

A series of vinyl asbestos compositions were prepared. Following are the formulae:

| Ingredients | Parts | | | | |
|---|---|---|---|---|---|
| | Control | H | J | K | L |
| Asbestos | 200 | 200 | 200 | 200 | 200 |
| Ground limestone, 40 mesh | 570 | 570 | 570 | 570 | 570 |
| Titanium dioxide | 40 | 40 | 40 | 40 | 40 |
| Vinyl chloride-vinyl acetate copolymer resin mixture | 134 | 132 | 132 | 129 | 130 |
| Epoxidized soya oil | 6.2 | 6.2 | 6.2 | 6.2 | 6.2 |
| Butyl benzyl phthalate | 41.8 | 43.8 | 42.8 | 41.8 | 43.8 |
| Dicyandiamide, 70% | 4 | | | | |
| Barium stearate | 2 | | 2 | 2 | |
| Zinc stearate | 1 | | 1 | 1 | |
| Alpha methyl glucoside | 1 | | | | |
| Melamine | | 8 | 6 | 6 | 6 |
| Dimerized rosin (Penros) | | | | 4 | 4 |

Specimens of the above tile were tested as in Example 1 for satisfactory or unsatisfactory initial color, for moisture growth, and for moisture absorption. Following are the results:

| Tile | Initial Color | Moisture Growth, Percent | Moisture Absorption, Percent |
|---|---|---|---|
| Control | Sat | 0.40 | 2.28 |
| H | Unsat | 0.16 | 1.70 |
| J | Unsat | 0.09 | 1.36 |
| K | Sat | 0.11 | 1.32 |
| L | Sat | 0.09 | 1.23 |

The unsatisfactory color in tile H and J was due to a pronounced pink appearance in the tile.

EXAMPLE 3

The following two vinyl asbestos compositions were prepared:

| Ingredients | Parts | |
|---|---|---|
| | Control | M |
| Asbestos | 200 | 200 |
| Ground limestone, 40 mesh | 568 | 568 |
| Titanium dioxide | 40 | 40 |
| Poly(vinyl chloride) resin mixture | 120 | 120 |
| Epoxidized soya oil | 6.2 | 6.2 |
| Butyl benzyl phthalate | 50.8 | 50.8 |
| Dicyandiamide, 70% | 4 | |
| Barium stearate | 2 | 2 |
| Zinc stearate | 1.5 | 1 |
| Alpha methyl glucoside | 1 | |
| Melamine | | 6 |
| Dimerized wood rosin (Penros) | | 4 |

Testing of specimens of the above tile gave the following results:

| Tile | Initial Color | Moisture Growth, Percent | Moisture Absorption, Percent |
|---|---|---|---|
| Control | Sat | 2.18 | 0.44 |
| M | Sat | 1.36 | 0.16 |

We claim:

1. A vinyl asbestos composition comprising a vinyl chloride resin, asbestos, and a stabilizing system comprising a stabilizing amount of about 0.1%–2.5% by weight melamine and about 0.05%–4% by weight rosin acid based on the weight of said composition.

2. A composition according to claim 1 wherein said vinyl chloride resin comprises a vinyl chloride-vinyl acetate copolymer.

3. A composition according to claim 1 wherein said melamine is present in an amount of about 0.4%–1% by weight.

4. A composition according to claim 1 wherein said rosin acid is present in an amount of about 0.2%–1.2% by weight.

5. A composition according to claim 1 wherein said rosin acid comprises wood rosin.

6. A composition according to claim 1 wherein said rosin acid comprises abietic acid.

7. A composition according to claim 1 wherein said rosin acid comprises dimerized rosin acid.

8. A vinyl asbestos composition comprising 3%–50% by weight asbestos fibers, 20%–80% by weight granular inorganic filler, 8%–30% by weight vinyl chloride resin binder, 0.2%–10% by weight plasticizer for said vinyl chloride resin, 0.1%–2.5% by weight melamine, and 0.05%–4% by weight of rosin acid.

References Cited by the Examiner

UNITED STATES PATENTS 2,490,247  12/1949  Amberg _____ 260—27
2,727,871  12/1955  Ropp _____ 260—27
3,084,135  4/1963   Scullin _____ 260—45.8
3,188,263  6/1965   Pflaumer _____ 260—27

FOREIGN PATENTS 115,542    11/1958  Russia.
35/15,385  10/1960  Japan.

OTHER REFERENCES

Chemical Abstracts, vol. 53, No. 13, July 10, 1959, p. 12728h relied on.

Chemical Abstracts, vol. 55, No. 14, July 10, 1961, p. 13919f.

Hercules: "Wood Rosins and Stabilized Rosins," Bulletin of Hercules Powder Co., Bulletin No. 400–429C 4M 9–57 4871, pp. 3–6, 8 and 12 relied upon.

Chevassus et al.: The Stabilization of Polyvinyl Chloride, p. 149 relied on.

LEON J. BERCOVITZ, *Primary Examiner.*

F. McKELVEY, *Assistant Examiner.*

UNITED STATES PATENT OFFICE
CERTIFICATE OF CORRECTION

Patent No. 3,314,906  April 18, 1967

George E. Bagley et al.

It is hereby certified that error appears in the above numbered patent requiring correction and that the said Letters Patent should read as corrected below.

In the heading to the printed specification, lines 4 to 7, for "George E. Bagley, Lancaster County, Pa. (2425 Mayfair Drive, Lancaster, Pa. 17603), and William F. Goodyear, Jr., Lancaster County, Pa. (72 Barre Drive, Lancaster, Pa. 17601)" read -- George E. Bagley and William F. Goodyear, Jr., both of Lancaster County, Pa., assignors to Armstrong Cork Company, Lancaster, Pa., a corporation of Pennsylvania --; column 3, line 32, for "in" read -- is --.

Signed and sealed this 14th day of November 1967.

(SEAL)
Attest:

EDWARD M. FLETCHER, JR.
Attesting Officer

EDWARD J. BRENNER
Commissioner of Patents